United States Patent
Tanaka (10) Patent No.: US 6,985,071 B1
(45) Date of Patent: Jan. 10, 2006

(54) ELECTRONIC EQUIPMENT AND OPERATION CONTROL METHOD FOR ELECTRONIC EQUIPMENT

(75) Inventor: Izuru Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/600,925

(22) PCT Filed: Nov. 25, 1999

(86) PCT No.: PCT/JP99/06589

§ 371 (c)(1),
(2), (4) Date: Sep. 22, 2003

(87) PCT Pub. No.: WO00/31736

PCT Pub. Date: Jun. 2, 2000

(30) Foreign Application Priority Data

Nov. 25, 1998 (JP) ................................. 10/334029

(51) Int. Cl.
*G08B 1/00* (2006.01)

(52) U.S. Cl. .............................. 340/309.16; 340/309.8; 340/309.9; 368/10; 368/223; 368/251; 368/262

(58) Field of Classification Search .................... None
See application file for complete search history.

(56) References Cited

U.S. PATENT DOCUMENTS

| 4,615,609 | A | * | 10/1986 | Honma ......................... 399/88 |
| 5,166,911 | A | * | 11/1992 | Misawa et al. ............... 368/10 |
| 5,285,265 | A | * | 2/1994 | Choi ........................... 348/565 |
| 5,479,266 | A | * | 12/1995 | Young et al. .................. 386/83 |
| 5,543,933 | A | * | 8/1996 | Kang et al. ................... 386/83 |
| 6,115,624 | A | * | 9/2000 | Lewis et al. ................. 713/330 |
| 6,263,147 | B1 | * | 7/2001 | Tognazzini ................... 386/46 |
| 6,388,952 | B2 | * | 5/2002 | Kim ............................. 368/74 |

* cited by examiner

Primary Examiner—Benjamin C. Lee
(74) Attorney, Agent, or Firm—Jay H. Maioli (57) ABSTRACT

An electronic unit that is permitted to undergo operation control on the basis of a timer reservation set by a user includes a setting section for setting a time designated by the user, an operation control section for controlling the operation of the electronic unit in accordance with time set by the setting section, a display section for displaying an operation portion for operating the electronic unit, a display control section such that when the electronic unit is operative in accordance with the operation control section, it controls the display section so that a specific display is carried out on the display section, and a designation detecting section for detecting a designation of the user with respect to the specific display, whereby when a designation of the user is detected by the designation detecting section, the operation control section conducts a control to neglect the time set by the setting section and to continue the operation of the electronic unit when the designation of the user is detected.

9 Claims, 8 Drawing Sheets

ELECTRONIC EQUIPMENT AND OPERATION CONTROL METHOD FOR ELECTRONIC EQUIPMENT

TECHNICAL FIELD

This invention relates to an electronic equipment and an operation control method therefor which can carry out operation control by timer.

BACKGROUND ART

In recent years, audio equipments having timer function have been known. This timer function is, e.g., function to allow power supply of the equipment to be turned ON or OFF at timer designation time such as start time and/or end time, etc. that user has set in advance. Moreover, this timer function is function to execute operation such as receiving operation of broadcasting program by tuner and/or reproduction of CD (Compact Disc), etc. at time that user has set. Namely, by employing an approach to allow user to make setting such that, e.g. tuner is turned ON at start time which is timer designation time, such a control is carried out that tuner is operative when current time measured by the timer function reaches start time. Accordingly, user can set, e.g., rising scheduled time as start time to utilize the audio equipment as alarm clock. Moreover, by employing an approach to allow user to set, as end time, time that a predetermined time has been passed from start time, such a control is carried out that, e.g., power supply of electronic equipment is turned OFF when current time reaches the end time. As stated above, if timer designation time is set, ON/OFF operation of the power supply of audio equipment, etc. can be controlled without necessity of manual operation of user.

Further, such a timer function is used also in electronic equipment, e.g., air conditioner to carry out air conditioning within the room, etc. in addition to the audio equipment, and such a configuration is provided that, e.g., operation of the air-conditioner to start operation, etc. at designated time can be controlled.

Meanwhile, in the case where, e.g., user listens to broadcasting program selected by tuner in the state where power supply is turned ON by the timer function, when favourite music or interesting news is broadcasted at time close to end time, there are instances where user is desirous to listen to such broadcasting program continuously to that time. In such a case, it is required that user carries out operation to cancel, i.e., nullify timer designation time, and audio equipments provided with, e.g., mechanical operation keys dedicated for timer function are known. However, for users who do not utilize such timer function, operation keys relating to timer function would be useless. In addition, when there are useless operation keys, this constitutes the cause of confusion of user in carrying out various operations.

DISCLOSURE OF THE INVENTION

An object of this invention is to solve problems as described above.

To attain this object, in accordance with this invention, there is provided an electronic equipment, which is permitted to undergo operation control on the basis of timer reservation by user, comprising setting means for setting time designated by user, operation control means for controlling operation of the electronic equipment in accordance with time set by the setting means, display means for displaying operation means for operating the electronic equipment, display control means for controlling the display means so that specific display is carried out on the display means when the electronic equipment is operative in accordance with the operation control means, and designation detecting means for detecting designation of user with respect to the specific display, whereby when designation of user is detected by the designation detecting means, the operation control means conducts a control to neglect the time set by the setting means and such that operation of the electronic equipment when designation of user is detected is continued.

In addition, in accordance with this invention, there is provided an operation control method for an electronic equipment permitted to undergo operation control on the basis of timer reservation by user, the method including a setting step of setting time designated by user, an operation control step of controlling operation of the electronic equipment in accordance with the set time, a display control step of controlling display means so that specific display is carried out when the electronic equipment is operative, a designation detection step of detecting designation of user with respect to the specific display, and a step such that when designation of user is detected at the designation detection step, control is conducted such that the set time is neglected and operation of the electronic equipment when designation of user is detected is continued.

BEST MODE FOR CARRYING OUT THE INVENTION

Explanation will now be given with reference to the attached drawings in connection with an electronic equipment and an operation control method for an electronic equipment according to this invention.

Figure 1:
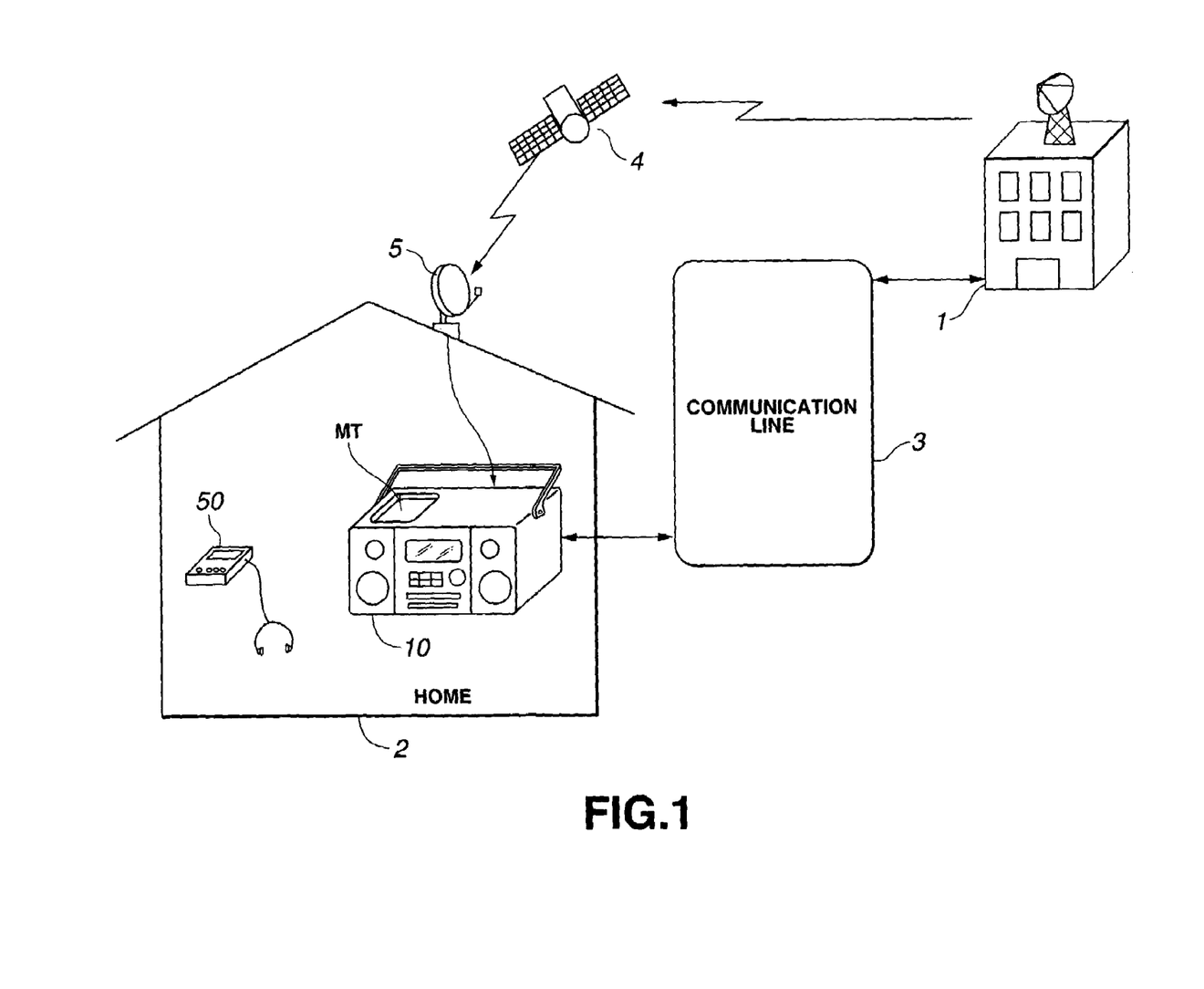
FIG. 1 is a model view showing outline of information delivery system to which this invention is applied.

FIG. 1 is a model view showing outline of information delivery system to which this invention is applied. This information delivery system is essentially composed of a recording/reproducing apparatus (unit) 10 that general user uses in home 2, etc., and an information center 1 as information service organization for providing information used in the recording/reproducing unit 10.

The information center 1 and the recording/reproducing unit 10 carry out communication of various information through a communication line 3. The communication line 3 is comprised of, e.g., public line network such as ISDN line, etc. or dedicated line network constructed exclusively for such system, and the form of the line is not specifically limited. In addition, information communication between the information center 1 and the recording/reproducing unit 10 may be carried out through satellite communication line composed of, e.g., a communication satellite 4 and a parabolic antenna 5 installed at each home 2, etc.

The recording/reproducing unit 10, to which this invention is applied, that general user uses comprises data file storage section of large capacity therewithin, and has drive function of the so-called package media such as optical disc, magneto-optical disc, magnetic disc, semiconductor memory, etc., data input function from tuner for receiving broadcasting program or other equipment, and data input function through communication line, etc. In addition, the recording/reproducing unit 10 stores, into the data file storage section, as respective files, audio data, video data, other various data reproduced from package media that user purchases such as optical disc, magneto-optical disc, magnetic disc or semiconductor memory, etc., and various data inputted from other equipments and/or communication lines.

Further, e.g., files of music, etc. stored in the recording/reproducing unit 10 as respective one files every respective one musics are arbitrarily reproduced by user. Accordingly, if e.g., user having a large number of optical discs stores all musics of all optical discs as respective one files in the recording/reproducing unit 10, it is possible to reproduce desired music, etc. without purposely selecting optical disc, etc. to load it into the recording/reproducing unit 10.

The information center 1 provides various information for pay or for free with respect to the recording/reproducing unit 10. For example, the information center 1 provides, with respect to the recording/reproducing unit 10, as information (additional information) relating to files of musics, etc. stored in the recording/reproducing unit 10, text data such as name of music (track name), artist name, words (lyric lines), etc., picture data such as music image, picture of artist or album jacket, etc., address of internet home page of artist (URL: Uniform Resource Locator), information relating to author's right, names of the concerned persons (songwriter, composer, producer, etc . . . , etc. The recording/reproducing unit, sores e.g., these information provided from the information center 1 in correspondence with files of music, and/or uses such information for various operations to display them on the display section, etc.

Moreover, the information center 1 transmits audio data itself, i.e., music, etc. to the recording/reproducing unit 10, and the recording/reproducing unit 10 stores received audio data as file. Namely, sale/providing system of music, etc. different from sale by package media such as optical disc, etc. is constructed.

In this information delivery system, as apparatus (unit) that user uses, there is a portable recording/reproducing unit (hereinafter referred to as "portable unit") 50 connectable to the recording/reproducing unit 10. The portable unit 50 comprises therewithin data file storage section, e.g., solid-state memory, etc. which can store file such as audio data, etc. Further, when the portable unit 50 is connected to the recording/reproducing unit 10, files stored in the recording/reproducing unit 10, e.g., music, etc. are copied or moved into the data file storage section within the portable unit 50.

Conversely, files stored in the data file storage section within the portable unit 50 are copied or moved into the data file storage section within the recording/reproducing unit 10.

User moves or copies, into the portable unit 50, desired file of files stored in the recording/reproducing unit 10, thereby making it possible to utilize that file at the portable unit 50. For example, user moves files of music that he desires to listen to at that day from the recording/reproducing unit 10 to the portable unit 50, thereby making it possible to listen to such music by using the portable unit 50, e.g., at the place where he goes out.

Figure 2:
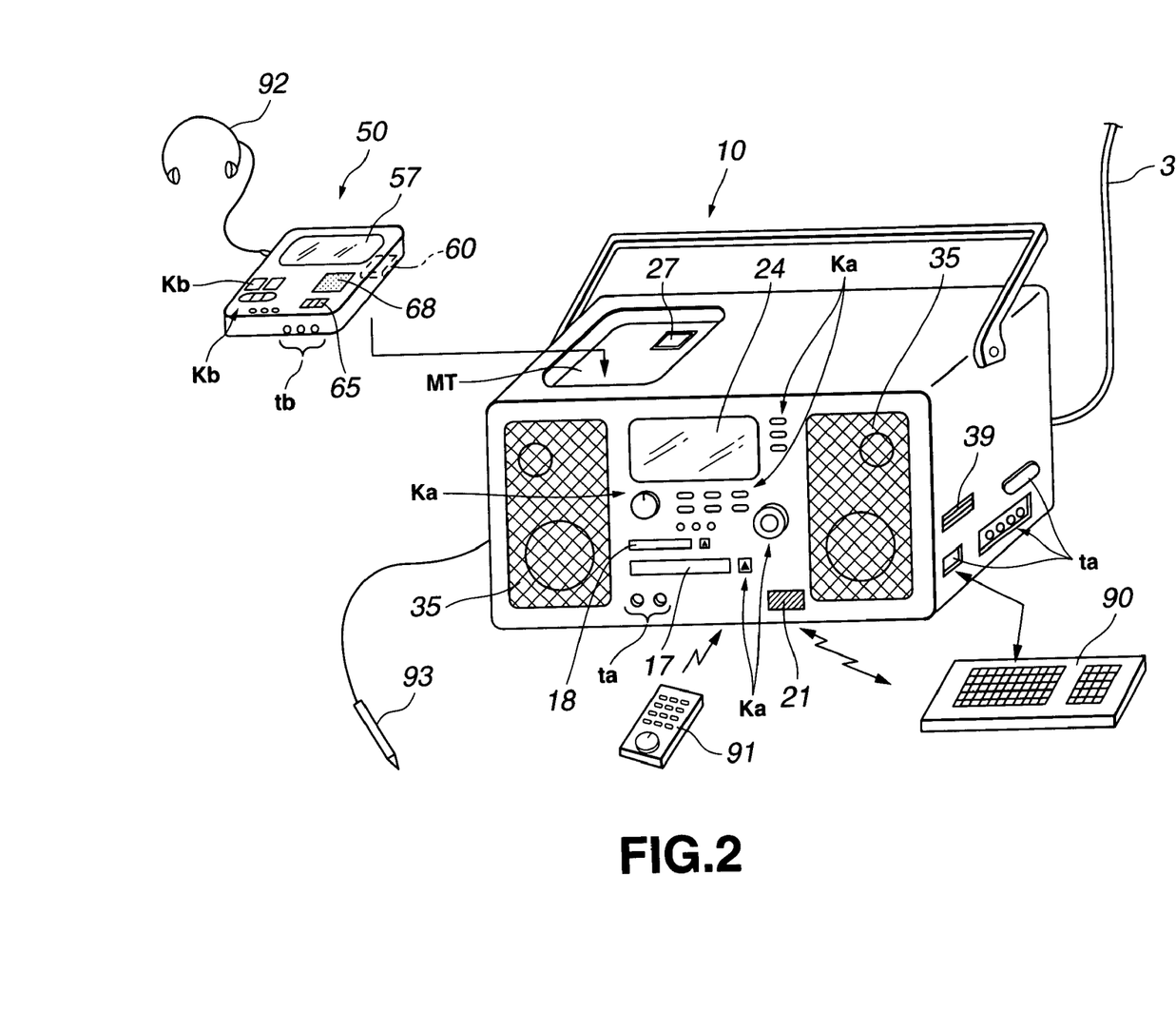
FIG. 2 is a perspective view showing more practical appearance of recording/reproducing apparatus (unit) and portable unit to which this invention is applied.

FIG. 2 is a perspective view showing more practical appearance of the recording/reproducing unit 10 and the portable unit 50. It is to be noted that the configuration which will be described here is an example to the last, as appearances of respective equipments and user interface configuration, i.e., configurations for operation and/or display, and connection form between the recording/reproducing unit 10 and the portable unit 50, etc., various configurations may be conceivable in addition to the above.

As shown in FIG. 2, the recording/reproducing unit 10 is caused to be, e.,g., equipment of the so-called radio cassette type so as to become conformity with use at home of user. It should be noted that the recording/reproducing unit 10 may be of the component type.

At the recording/reproducing unit 10, operation keys, operation buttons and rotational pressing type keys, etc. in which menu is changed by rotation and is determined by pressing (jog dials) are provided at the equipment front panel, etc. as operation elements Ka, wherein user uses the above-mentioned keys or buttons for carrying out various operations. Moreover, as output means with respect to user, there are provided speakers 35 for outputting reproduction sound, etc. and a display section 24 for displaying various information. The display section 24 is constituted by, e.g., liquid crystal panel, etc.

Further, in order to reproduce, at the recording/reproducing unit 10, data, etc. from optical disc, e.g., audio CD, CD-ROM (Compact Disc Read Only Memory) that user has, or to carry out dubbing of data from optical disc to hard disc therewithin which will be described later, there is provided a CD insertion portion of a CD-ROM drive 17 into which optical disc is loaded.

Similarly, in order to allow the recording/reproducing unit 10 to carry out record/reproduction of magneto optical disc, e.g., audio MD (Mini Disc: Trade name), data MD, etc. that user has, or to carry out dubbing of data from magneto-optical disc with respect to hard disc therewithin, there is provided a MD insertion portion of the MD drive 18 into which magneto-optical disc is loaded.

Further, at the recording/reproducing unit 10, various terminals ta for carrying out connection to other equipments are prepared. The terminals ta are terminals used for connection of, e.g., microphone, headphone, and line connection terminal, optical digital connection terminal, and/or interface connector, etc. for connection to other audio visual equipment or personal computer, etc.

Further, as operation input means for user at the recording/reproducing unit 10, there may be employed a keyboard 90 and a remote commander 91 in addition to the above-described operation elements Ka. When the keyboard 90 is connected through connector for keyboard of the terminals ta, operation information from the keyboard 90 is inputted to the recording/reproducing unit 10 through the terminal ta, and when infrared ray transmitting section is mounted at the keyboard 90, operation information is outputted from the keyboard 90 by the infrared wireless system and operation information is inputted from a light receiving section 21 to the recording/reproducing unit 10.

The remote commander 91 outputs operation information, e.g., by the infrared ray system. That operation information by the infrared ray signal is inputted from the light receiving section 21 to the recording/reproducing unit 10. It is to be noted that output of operation information in the case where keyboard 90 employs the wireless system and/or output of operation information from the remote commander 91 may be carried out by radio wave in place of infrared ray.

Further, at the recording/reproducing unit 10, an input pen 93 forming input means together with the display section 24 is provided. Namely, picture for operation is displayed as the so-called GUI on the display section 24, and user allows the input pen 93 to be in touch with picture on the display section 24, whereby operation input corresponding to that picture is carried out as touch pen input.

In addition, at the recording/reproducing unit 10, there is provided a PCMCIA (Personal Computer Memory Card International Association) slot 39. Thus, transmission/reception of data to and from other equipments, etc. can be made through PCMCIA card.

The portable unit 50 is equipment caused to be compact and light in weight in order that it is suitable in the case where user carries and uses it. At the portable unit 50, various operation keys for allowing user to carry out various operations are provided as operation element Kb. Although not shown, it is a matter of course that jog dials of the rotational pressing type, etc. may be provided.

Moreover, at the portable unit 50, a speaker 68 for outputting reproduction sound, etc. and a display section 57 for displaying various information are provided as output means with respect to user. The display section 57 is formed by, e.g., liquid crystal panel, etc. Further, at the portable unit 50, a microphone 65 is provided as input means of user.

Further, at the portable unit 50, various terminals tb for carrying out connection to other equipments are prepared. The terminals tb are terminals used for connection to microphone and or headphone. In addition, the terminals tb are line connection terminal, optical digital connection terminal and/or interface connector, etc. which are connectable to other audio visual equipment and/or personal computer, etc. For example, when user carries such portable unit 50 to listen to music, etc., headphone 92 is caused to be connected to headphone terminal of the terminals tb in addition to reproduction of speech (sound) from the speaker 68, thereby permitting user to listen to music, etc. by using the headphone 92.

User connects the recording/reproducing unit 10 and the portable unit 50, thereby making it possible to carry out various data communication between the recording/reproducing unit 10 and the portable unit 50, e.g., communication of actual file data such as audio data, etc. and control data necessary for such communication processing therebetween, etc.

In this more practical example, at the recording/reproducing unit 10, there is provided a mounting (loading) portion MT having a connector 27. As the result of the fact that the portable unit 50 is mounted (loaded) into the mounting (loading) section MT, both equipments are connected. When the portable unit 50 is mounted (loaded) into the mounting (loading) portion MT, a connector 60 provided at the lower portion of the portable unit 50 and the connector 27 within the mounting (loading) portion MT are connected. Thus, data communication between both equipments is carried out through the connectors 60, 27. In this case, with respect to connection between the recording/reproducing unit 10 and the portable unit 50, there may be employed, e.g., line connection system using communication cable or wireless (radio) connection system utilizing infrared rays, etc.

Figure 3:
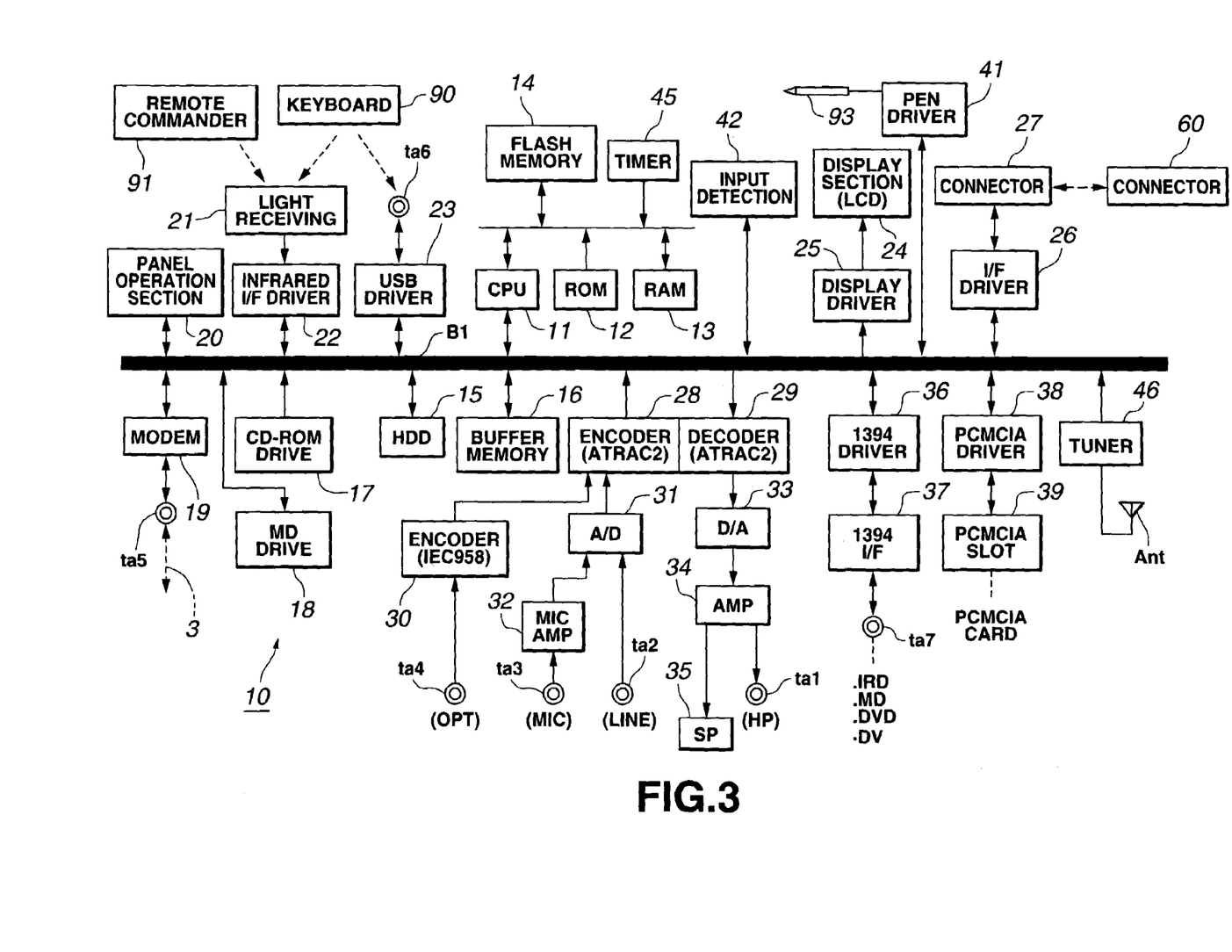
FIG. 3 is a block diagram showing a more practical configuration of the recording/reproducing unit to which this invention is applied.

The more practical internal configuration of the recording/reproducing unit 10 will now be described with reference to FIG. 3.

At the recording/reproducing unit 10, as described above, operation elements Ka of the push type or rotational pressing type are provided as a panel operation section 20. As the result of the fact that the panel operation section 20 is operated by user, operation signals for executing various operations of the recording/reproducing unit 10 are generated. Thus, the recording/reproducing unit 10 becomes operative in accordance with the operation signals.

Moreover, while input pen 93 is shown in FIG. 2, there is provided, at the recording/reproducing section 10, an input detecting section 42 for the purpose of detecting that input by the input pen 93 has been carried out with respect to operation key display of the display section 24. Further, a pen driver 41 for driving the input pen 93 is also provided. As the input system by input pen 93, e.g., the electrostatic capacity detection system is used. Namely, electrode is provided at the front end of the input pen 93 and the input pen 93 is driven by the pen driver 41. On the other hand, electrodes are disposed in a matrix form within the range corresponding to the input detecting section 42 of the display surface of the display section 24. When the front end of the input pen 93 touches any one of the electrodes in the matrix form, electrostatic capacity of the electrode at the position where the input pen 93 has touched varies so that position corresponding thereto is detected. Thus, it is judged that operation input as operation picture displayed at that position has been carried out. In this case, as the input system by input pen, other systems may be used. For example, there is conceivable a mechanical configuration such that switch electrodes of matrix form of double layers are disposed as input detection sections 42, whereby switch electrode at the position pressed by the input pen 93 is in contact therewith so that position of the switch electrode in contact therewith is detected. In this case, pen driver 41 is unnecessary. In addition, there is no necessity that input pen 93 is of dedicated pen type.

Moreover, for example, in order to facilitate input of name of music and artist name, etc. corresponding to recorded audio information, keyboard 90 and/or remote commander 91 can be utilized as described above. In this case, keyboard 90 is connected to USB (universal serial bus) terminal ta6 so that input by the keyboard 90 can be made. In other words, input signal from the keyboard 90, i.e., operation signal is delivered to USB driver through USB terminal ta6, and is taken into the recording/reproducing unit 10. In this example, various terminals ta1 to ta7 in FIG. 3 correspond to respective ones of terminals ta shown in FIG. 2.

Operation signal by infrared rays from the remote commander 91 and operation signal in the case where the keyboard 90 carries out infrared ray output are subjected to photoelectric conversion at the light receiving section 21. The signals thus obtained are delivered to an infrared interface driver 22 and are taken into the recording/reproducing unit 10. It is to be noted that there may be employed such a configuration to output, to the external, data through infrared interface driver 22 or USB driver 23.

At the recording/reproducing unit 10, there are provided a RAM 13, a ROM 12, a flash memory 14 which are ordinary components of the personal computer. The operation of the entirety of the recording/reproducing unit 10 is controlled by a CPU 11. Transmission/reception of file data and/or control data between respective blocks are carried out through a bus B1.

Operation input signals inputted by the panel operation section 20, the input pen 93, the remote commander 91, and the keyboard 90, etc. which are described above are transferred to the CPU 11. Thus, the CPU 11 executes a predetermined processing corresponding to each operation. For this reason, in the ROM 12, there is stored program, etc. for controlling the operation of the recording/reproducing unit 10 in accordance with an input signal inputted as the result of the fact that the panel operation section 20, etc. is operated. At the RAM 13 and the flash memory 14, data area and task area required in executing program are temporarily secured. It is to be noted that such an approach may be employed that program loader is stored in the ROM 12 and program itself is loaded into the flash memory 14 by the program loader.

A timer 45 has time-count function of current time and is caused to be of structure capable of notifying, to the CPU 11, timer designation time as monitoring time, e.g., operation start time and operation end time of the recording/reproducing unit 10. The timer 45 is started in the state where timer designation time is stored in the RAM 13 by setting of user and carries out comparison between current time of the timer 45 and timer designation time stored in the RAM 13 by interruption processing which will be described later. Thus, the timer 45 is operative so that when current time becomes in correspondence with operation start time, it carries out operation start notification with respect to the CPU 11, and when current time becomes in correspondence with operation end time, it carries out operation end notification with respect to the CPU 11. In this example, in the RAM 13, along with timer designation time, there is also stored designation operation information corresponding to operation content, e.g., reception of broadcasting program by tuner and/or reproduction of CD-ROM loaded with respect to CD-ROM drive 17, etc. Namely, the relationship between various operation starts and time is set by user. The timer 45 carries out a required notification processing with respect to the CPU 11 for the purpose of executing such set information.

The CPU 11 carries out operation control based on designation operation information stored in the RAM 13 when it receives notification from the timer 45. Further, in this more practical example, when the CPU 11 receives notification relating to operation start from the timer 45, it executes operation controls and carries out a control to display, on the display section 24, symbol indicating that timer operation is being carried out, i.e., active mark. It is to be noted this symbol will be described later in detail.

With respect to the CD-ROM drive 17, optical disc, e.g., audio CD, CD-ROM, CD text, etc. is loaded from the CD insertion portion of the CD-ROM drive 17 shown in FIG. 2. Information stored on the optical disc is read out by the optical pick-up at one time speed or higher speed, e.g., 16 times speed or 32 times speed. Moreover, with respect to MD drive 18, optical disc or magneto-optical disc, e.g., audio MD, or data MD, etc. is loaded from the MD insertion portion of the MD drive 18 shown in FIG. 2. By the optical pick-up of the MD drive 18, information stored on the optical disc or the magneto-optical disc is read out, or information is recorded with respect to loaded magneto-optical disc.

It is to be noted that while both CD-ROM drive 17 and MD drive 18 are provided in this more practical example, either one of them may be provided, or there may be employed drives corresponding to other media as media for storing information, e.g., MO disc (magneto-optical disc), optical discs or magnetic discs of other systems, or memory card, etc. provided with semiconductor memory.

The recording/reproducing unit 10 comprises a tuner 46, and the tuner 46 is caused to be of structure to select and receive, through an antenna portion Ant comprised of antenna corresponding to various broadcast radio waves, broadcast program of, such as, for example, television broadcast, i.e., ground wave broadcast or satellite broadcast, radio broadcast such as AM broadcast or FM broadcast, etc. In addition, the tuner 46 comprises A/D converter (not shown) and is caused to be of structure to convert receiving signal of the selected broadcast program into digital audio data to output such data.

There is provided hard disc drive (HDD) 15 for carrying out recording/reproduction of information with respect to hard disc as large capacity of storage means within the recording/reproducing unit 10. At the HDD 15, there are stored audio information, e.,g., music data, etc. which has been read out from, e.g., CD-ROM drive 17 or MD drive 18 and picture data such as text data, e.g., disc title, name of music (track name), artist name, words, music image, picture of artist or album jacket, etc as additional information relating to file of this audio information. In addition, e.g., audio information of broadcast program selected by the tuner 46 is stored with respect to HDD 15.

At the recording/reproducing unit 10, there are provided an encoder 28 for compressing audio data by the ATRAC2 (Adaptive Transform Acoustic Coding 2, trade name) and a decoder 29 for decoding the audio data compressed by the ATRAC2 system. The encoder 28 and the decoder 29 respectively carry out encode operation and decode operation with respect to audio data delivered thereto in accordance with control of the CPU 11.

Moreover, at the recording/reproducing unit 10, there is provided a buffer memory 16 for temporarily storing audio data to be processed. The buffer memory 16 carries out write/read operation of data by control of the CPU 11.

For example, in the case of transferring, to the HDD 15, audio data which has been read out from the optical disc in the CD-ROM drive 17, as pre-processing where audio data is recorded with respect to the HDD 15, audio data which has been read out from the optical disc is temporarily stored into the buffer memory 16, and that audio data is delivered to the encoder 28, at which it is encoded by the ATRAC2 system. Further, data encoded at the encoder 28 is temporarily stored for a second time into the buffer memory 16. Finally, audio information thus encoded is stored with respect to the HDD 15.

It is to be noted that while, in this more practical example, the recording/reproducing unit 10 is caused to be of structure such that audio data encoded in accordance with the ATRAC2 system by the encoder 28 is stored with respect to the HDD 15, there may be employed, e.g., a configuration such that data which is read out from the CD-ROM drive 17 is stored with respect to the HDD 15 as it is.

The encoder 28 is caused to be of structure such that not only data which has been read out from optical disc loaded with respect to the CD-ROM drive 17 is encoded, but also audio signal inputted through an amplifier 32 from microphone terminal ta3 to which microphone is connected, and audio signal inputted from line input terminal ta2 to which equipment such as other CD player, etc. are connected are inputted through an A/D converter 31. These inputted audio data are also encoded by the encoder 28. Further, the recording/reproducing unit 10 is caused to be of structure such that data inputted from external equipment, e.g., CD player, etc. connected to optical digital terminal ta4 is inputted to the encoder 28 through an IEC 958 (International Electrotechnical Commission 958) encoder 30. Data inputted in accordance with the optical digital system in this way is also encoded by the encoder 28.

At the recording/reproducing unit 10, as described above, data inputted from external equipment is encoded by the encoder 28 thereafter to have ability to store encoded data, e.g., in file units with respect to HDD 15. It is to be noted that while ATRAC2 (trade name) is used as encode algorism of the encoder 28, it is only required that corresponding encode algorism is encode algorism for compressing information, and may be, e.g., ATRAC (trade name), ATRAC3 (trade name), MPEG (moving picture coding experts group), PASC (precision adaptive sub-band coding), TwinVQ (Transform-domain Weighted Interleave Vector Quantization, trade name), RealAudio (trade name), LiquidAudio (trade name), MA-Audio (Microsoft Audio), etc.

Moreover, at the recording/reproducing unit 10, there is provided a modem 19 which is interface connectable to external network, connected to communication terminal ta5 as communication line 3, e.g., Internet, TEL network, cable TV, wireless network, etc. Further, request signal which makes a request for any service, and information of media loaded with respect to CD-ROM drive 17, user ID, user information, user charging information, etc. are sent to server at remote place through the modem 19.

At the server of the external network, i.e., server side commnicatable through communication line 3, collation processing by user ID, charging processing and retrieval of music additional information from disc information, e.g. title of music, artist name, composer, songwriter, words, jacket image, etc. are carried out. The server of the external network sends predetermined additional information that user requests back to the recording/reproducing unit 10. While the example where additional related information with respect to music is sent back is indicated here, there may be employed a configuration such that music information that user requests is directly down-loaded from the external network. In addition, there may be employed a configuration in which music information are sent back in correspondence with media information so that bonus track of a predetermined medium is acquired at the recording/reproducing unit 10 by delivery.

Audio information stored with respect to the HDD 15 is decoded by the decoder 29. Thus, reproduction sound is outputted from a speaker 35 through a D/A converter 33, an amplifier 34. Alternatively, audio information stored with respect to the HDD 15 is outputted as reproduction sound from headphone as the result of the fact that headphone is connected to headphone terminal ta1. It is to be noted that while the decoder 29 serves to carry out decode operation of the ATRAC2 system in this more practical example, any decode algorism corresponding to encode algorism of the encoder 28 may be employed. In addition, processing of the encoder 28 and the decoder 29 may be carried out by software by the CPU 11 without constituting them by hardware.

Moreover, it is also possible to similarly reproduce CD loaded with respect to the CD-ROM drive 17. Namely, respective music data recorded as respective tracks with respect to CD are read out from the CD in accordance with capacity of the buffer memory 16 in the CD-ROM drive 17 and are stored into the buffer memory 16. Such data are continuously delivered to the decoder 29 at a predetermined rate from the buffer memory 16. In this example, since data recorded on the CD is non-compressed data, the data is caused to be through the decoder 29 at the time of reproduction of CD and reproduction data is delivered to the D/A converter 33. Further, reproduction data is converted into analog audio signal by the D/A converter 33, and is then outputted as reproduction speech (sound) by the speaker 35 through the amplifier 34. Alternatively, reproduction data is outputted as reproduction sound from headphone as the result of the fact that headphone is connected to headphone terminal ta1.

Similarly, also in the case of the tuner 46, since data is not compressed, data is caused to be through the decoder 29. Received data is converted into analog audio signal by the D/A converter 33, and is then outputted as reproduction sound by the speaker 35 through the amplifier 34. Alternatively, as the result of the fact that headphone is connected to headphone terminal ta1, received data is outputted as reproduction sound from the headphone.

Further, the recording/reproducing unit 10 can also reproduce MD loaded with respect to the MD drive 18 to output data corresponding thereto. Namely, data which has been read out from the MD at the MD drive 18 is delivered to the decoder 29 through the buffer memory 16. Thus, decode operation with respect to compression processing is carried out. Further, such data is outputted as reproduction sound by the speaker 35 through the D/A converter 33 and the amplifier 34. Alternatively, as the result of the fact that headphone is connected to the headphone terminal ta1, data which has been read out from the MD is outputted as reproduction sound from the headphone.

Further, at the recording/reproducing unit 10, as interface for allowing user to carry out management/control of file such as audio data, etc. stored at the HDD 15, display section 24 is provided also as shown in FIG. 2. The display section 24 is driven by a display driver 25. On the display section 24, required characters, symbols and/or icons for operation, etc. are displayed on the basis of control of the CPU 11. In this more practical example, on the display section 24, there is displayed, as icon for operation, symbol indicating that the recording/reproducing unit 10 is being operated by timer reservation only for a time period of an operation by the timer reservation, i.e., only for a time period during which timer reservation operation is carried out. In addition, this symbol indicates that operation based on timer reservation is being carried out and is constituted so as to also function as icon for operation for nullifying (canceling) end time of the timer operation.

Further, on the display section 24, there is displayed folder or jacket image corresponding to audio file (hereinafter file in which audio data such as music, etc. is recorded will be called audio file). Thus, operation by pointing device such as the above-described input pen 93 can be made. For example, there can be carried out such an operation that audio file that user designates on picture of the display section 24 is reproduced. It is to be noted that click operation by mouse and touch operation system such that user touches by finger, etc. are conceivable.

Further, by operation of touch panel displayed on the display section 24, erasing of selected audio file and/or copying or move operation, etc. to external equipment, e.g., portable unit 50 can be made by control of the CPU 11.

Further, the display section 24 is caused to be of structure such that there is graphically displayed html (hyper text markup language) document as related information retrieved from WWW (World Wide Web) site on the internet on the basis of TOC (Table Of Contents) information of each medium loaded with respect to the CD-ROM drive 17. Further, the display section 24 is also used for displaying ordinary internet browser.

Moreover, the recording/reproducing unit 10 is caused to be of structure such that audio information is taken thereinto, through IEEE 1394 (The Institute Electronics Engineers, Inc.) interface 37, IEEE 1394 driver 36, from various equipments or systems connected to terminal ta7, e.g., IRD (Integrated Receiver/Decoder) for satellite broadcast, MD player, DVD (Digital Video Disc) player, or DV (Digital Video) player, etc. At the recording/reproducing unit 10, as described above, there is provided the PCMCIA slot 39 as further additional function. When PCMCIA card is loaded into the PCMCIA slot 39, expansion of various peripheral equipments such as external memory unit, other media drive, modem, terminal adapter, capture board, etc. through PCMCIA driver 38 can be easily made.

Further, as explained with reference to FIG. 2, at the recording/reproducing unit 10, there is provided connector 27 for connecting it to the portable unit 50. When the connector 27 and the connector 60 of the portable unit 50 side are connected, the CPU 11 can carry out communication of various data with the portable unit 50 through interface driver 26. For example, the interface driver 26 transfers, by control of the CPU 11, audio file stored at the HDD 15 through the connectors 27, 60 to the portable unit 50.

Figure 4A:
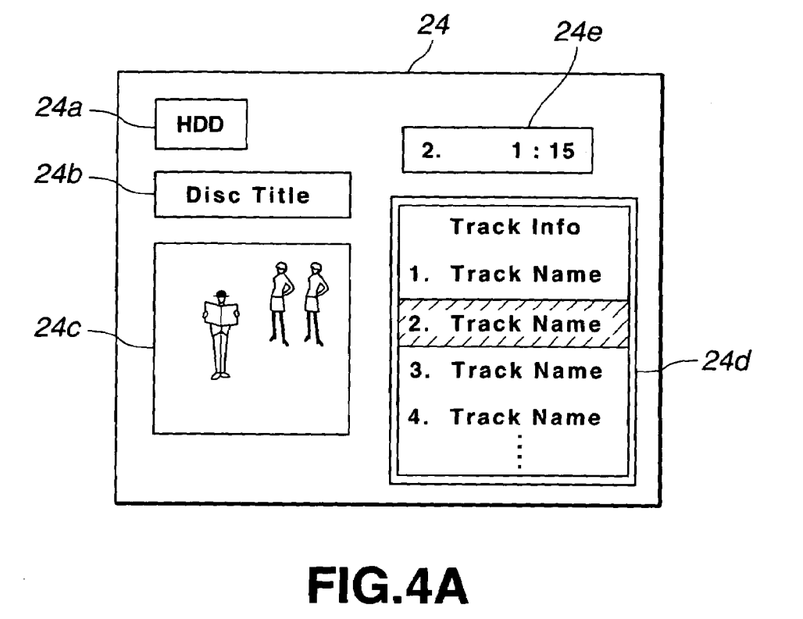
FIG. 4A is a view showing a more practical display example at the time of ordinary operation in display section of the recording/reproducing unit.
Figure 4B:
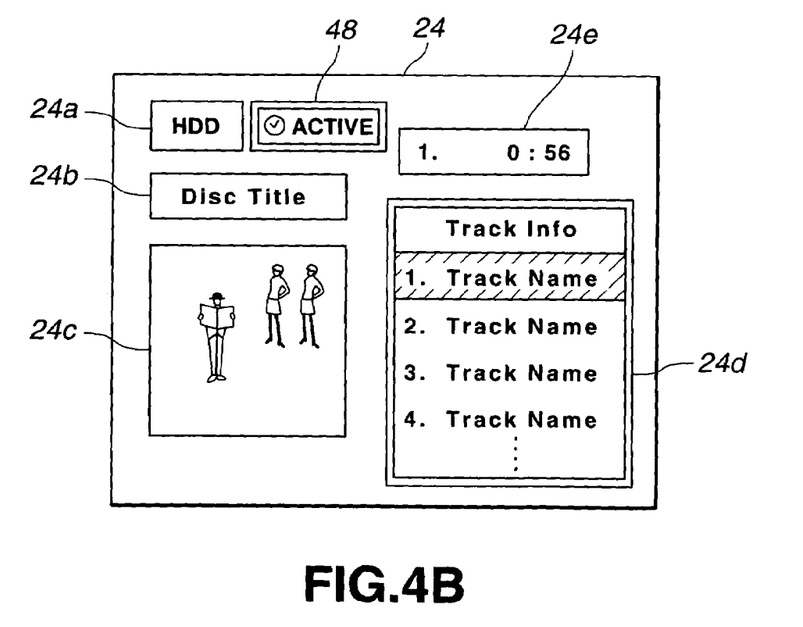
FIG. 4B is a view showing a more practical display example at the time of timer operation in display section of the recording/reproducing unit.

FIGS. 4A and 4B are views showing respective examples of display form of the display section 24, wherein FIG. 4A shows display example at the time of ordinary operation and FIG. 4B shows display example at the time of timer operation. In this case, there is shown an example of the state where, e.g., audio file of CD recorded at the HDD 15 is selected to carry out reproduction thereof.

Sound source information 24a shown in FIG. 4A shows sound source being selected. In this FIG. 4A, it is indicated that HDD 15 is selected. In addition, displays such as "CD", "MD", "Tuner", etc. are carried out in correspondence with sound source being selected. Further, on the display section 24, various information such as disc title information 24b, jacket image information 24c, audio file information (track name) 24d, etc. are displayed.

The audio file information 24d is also used as select operation picture of track to be reproduced. For example, user selects a desired track name by input pen 93, etc., thereby making it possible to select music. In this example, control is made such that music being selected, i.e., track name is subjected to reversal display (indicated by hatching). Namely, there is employed a display form such that user can easily grasp the operation state.

Playing time information 24e is information of passing time or remaining time, etc. of music being selected and played, i.e., music which is caused to undergo reversal display at the audio file information 24d.

It is to be noted that display example shown in FIG. 4A is only example and the display section 24 is adapted so that in the case where this display example is displayed as one page, it is possible to suitably select and display other page in which operation information of other operational element (operator), e.g., editing icon of MD drive 18, and/or select icon of broadcasting program by tuner 46 is displayed. An example of other page is as follows. For example, as set page for carrying out timer reservation, there are pages in which there are displayed timer designation time, e.g., start time and/or end time, kind of sound source to be operated, operation content, e.g., item in which setting of recording/reproduction, etc. is carried out.

As stated above, in the case where the recording/reproducing unit 10 carries out reproduction of audio file recorded with respect to the HDD 15 as ordinary operation, various information as shown in FIG. 4A are displayed. On the other hand, in the case of carrying out reproduction of audio file similarly to FIG. 4A by the timer reservation, active mark 48 is displayed as shown in FIG. 4B. The active mark 48 is specific picture displayed only when the recording/reproducing unit 10 is caused to be operative by timer reservation. This active mark 48 is caused to be operator for canceling (nullifying) timer designation time by timer reservation, i.e., end time during designation operation in the recording/reproducing unit 10. Namely, when user operates active mark 48 for a time period during which the recording/reproducing unit 10 is subject to timer operation, timer reservation is canceled. Thus, at times subsequent to the time set as end time, designation operation can be continued.

Accordingly, when operation of the active mark 48 is carried out in the state shown in FIG. 4B, the active mark 48 is erased. Thus, there is conducted such a control to shift to display form similar to the example shown in FIG. 4A. Namely, since the active mark 48 is not displayed at a time period except for the required timer operation, it can be prevented that unnecessary operator is displayed on the display section 24 so that user suffers from confusion in operation.

It is to be noted that while, as display form on the display section 24, as described above, user can select desired page, even in the case where page to be displayed is switched, display is continued with respect to the active mark 48. Namely, there is provided a configuration such that the active mark 48 is displayed at all times during operation by timer reservation.

More practical operation of the CPU 11 in the case where timer reservation is carried out by user will now be described with reference to the flowchart shown in FIG. 5. The CPU 11 at least functions as display control means for controlling display of the display section 24, etc., operation control means for controlling the operation of the recording/reproducing unit 10 in accordance with timer 45, and control means for controlling other operations of the entirety of the recording/reproducing unit 10.

In the case where user carries out timer reservation, user selects, e.g., operation picture corresponding to timer reservation setting at the display section 24, whereby processing by the CPU 11 shifts to timer reservation setting processing (S1). In the timer reservation setting processing, when timer reservation information such as timer designation time, e.g., start time or end time, designation operation, e.g., kind of sound source to be operated, operation content (recording, reproduction), reception of broadcasting program, etc., is set by user, the CPU 11 stores set timer reservation information into a predetermined area of the RAM 13. When timer reservation setting processing is completed in this way, the CPU 11 starts the timer 45 (S2). Thus, processing shifts to timer reservation executed (reserved) processing (S3).

Figure 6:
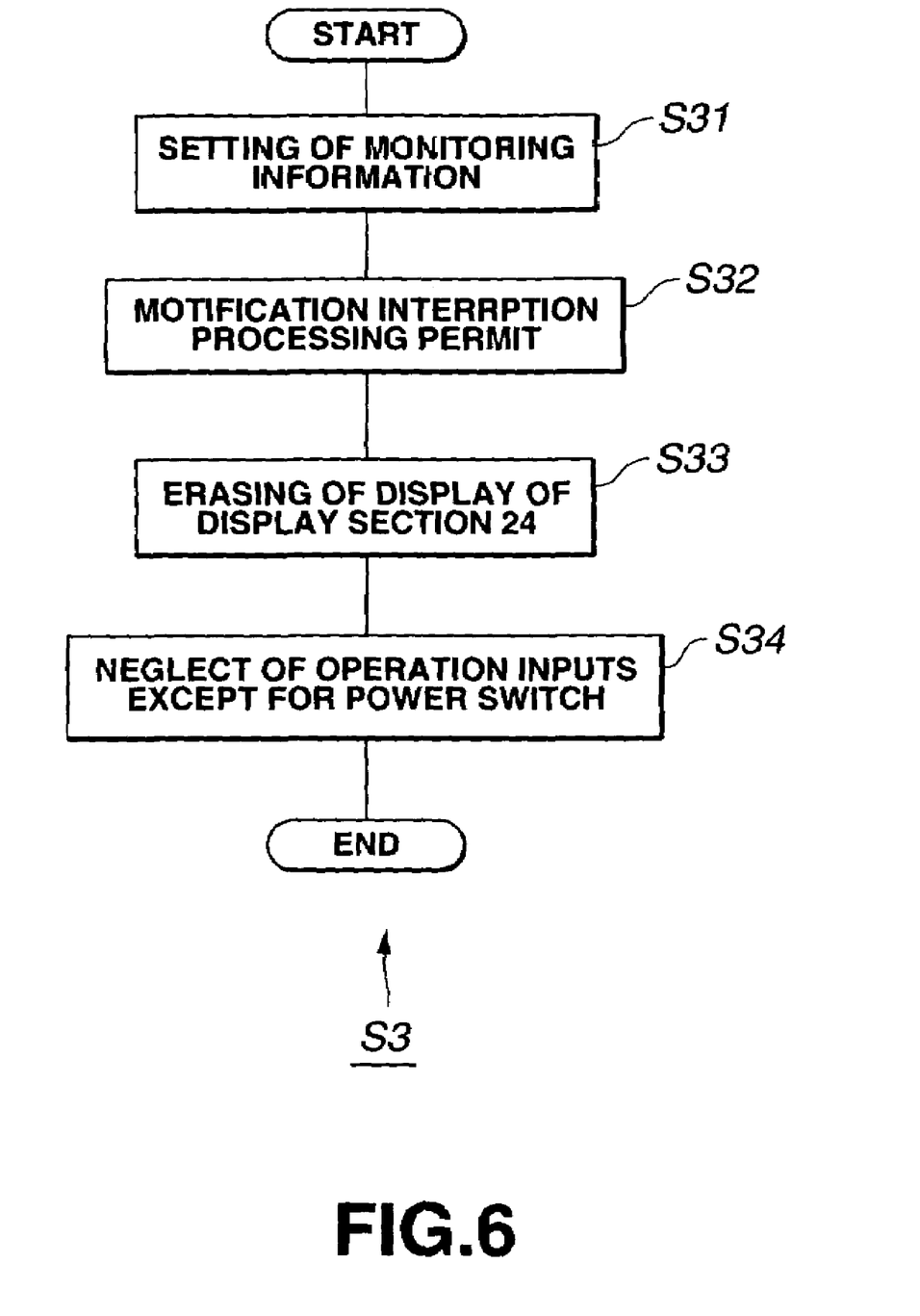
FIG. 6 is a flowchart for explaining more practical operation of CPU in timer reserved (reservation executed) processing.

The detail of the timer reserved operation (S3) of the CPU 11 will now be described with reference to the flowchart shown in FIG. 6.

The CPU 11 sets monitoring information at the RAM 13 by making reference to timer designation time, kind of sound source to be operated, and operation contents which are stored in the RAM 13 at step S1 (S31). This monitoring information consists of monitoring time, kind of sound source and operation content corresponding to timer designation time, etc. Further, the CPU 11 permits notification interruption processing every "00" second every minute, i.e., every one minute on the basis of time count function of the timer 45 (S32). Further, the CPU 11 erases display of the display section 24 (S33). Thus, the processing by the CPU 11 shifts to operation to neglect, e.g., operation input except for, e.g. power switch (S34).

Figure 5:
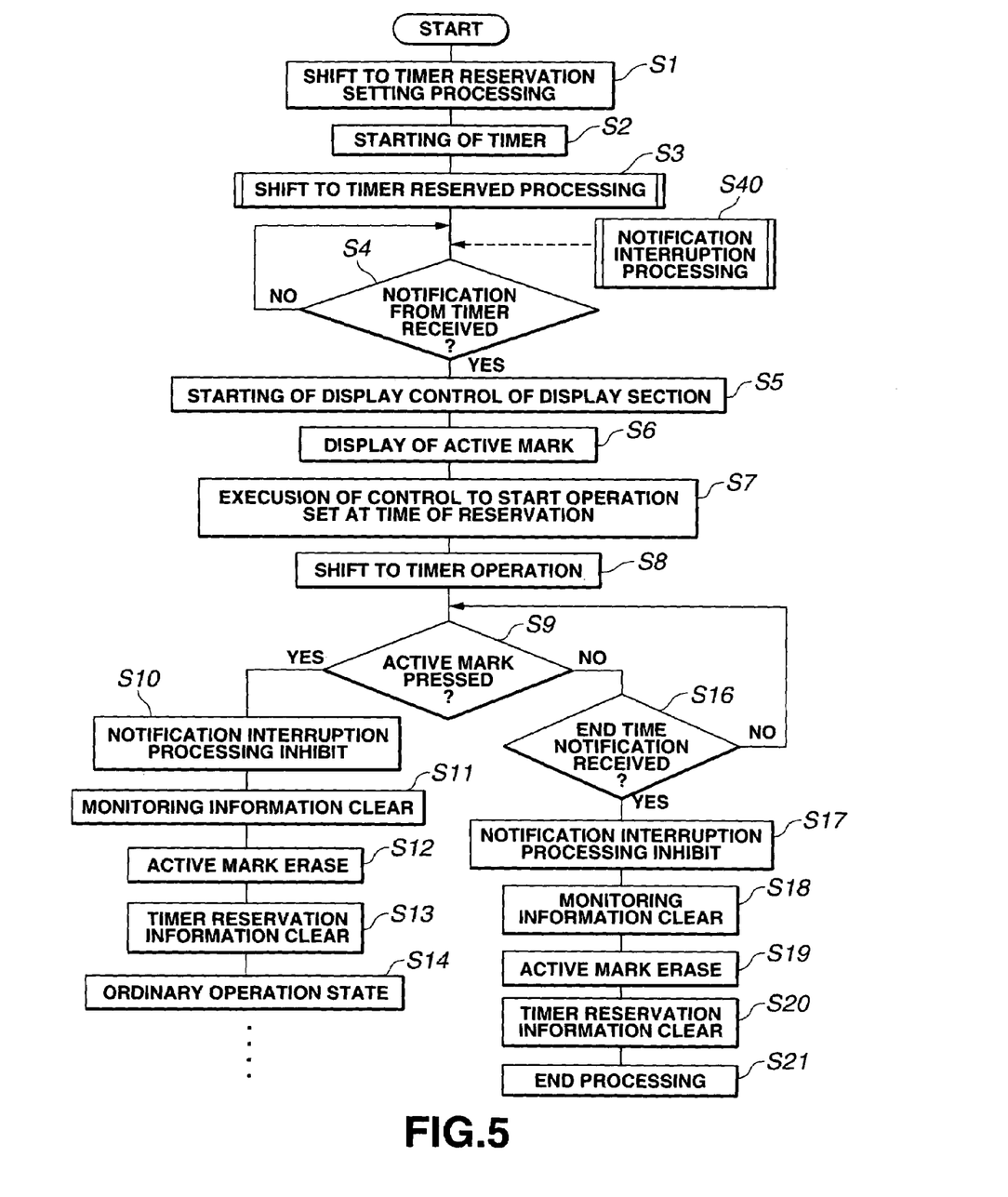
FIG. 5 is a flowchart for explaining more practical timer operation of CPU of the recording/reproducing unit.

When such a timer reserved processing (S3) is completed, the CPU 11 carries out, as shown in FIG. 5, judgment as to whether or not start time notification from the timer 45 is received (S4). This start time notification is notification received by interruption processing of the timer 45 permitted at the step S32 shown in FIG. 6.

The interruption processing of the timer 45 will now be described with reference to the flowchart shown in FIG. 7.

The timer 45 is started by the CPU 11 thereafter to make judgment as to whether or not current time is "00" sec. every minute (S41). The timer 45 detects current time (hour, minute) (S42) when it reaches "00" sec. every minute to carry out comparison between current time and monitoring time stored in the RAM 13 (S43). Further, when the current time and the monitoring time are in correspondence with each other, the timer 45 carries out judgment as to whether the monitoring time is start time or end time (S44). When the monitoring time is judged to be start time, the timer 45 carries out processing to notify arrival of start time of timer reservation with respect to the CPU 11 (S45). As this notification processing, if the CPU 11 periodically monitors required port, it writes arrival of start time of timer reservation with respect to this port. It is to be noted that in the case where CPU 11 is caused to be of structure capable of carrying out message communication, the timer 45 may carry out notification by required message. Further, when the timer 45 carries out notification of start time to the CPU 11, it sets, as monitoring time, end time set at the RAM 13 by the timer reservation setting processing (S1) of FIG. 5 (S46).

On the other hand, when timer 45 judges that monitoring time is end time (S44), it carries out processing to notify arrival of end time to the CPU 11 (S47). Similarly to the step S45, this notification processing is carried out by write operation into required port of the CPU 11 or by message communication, etc.

At the timer 45, such a notification interruption processing is carried out. At the CPU 11, as described later, in the processing at steps S4, S16, judgment based on the notification content is carried out.

Figure 7:
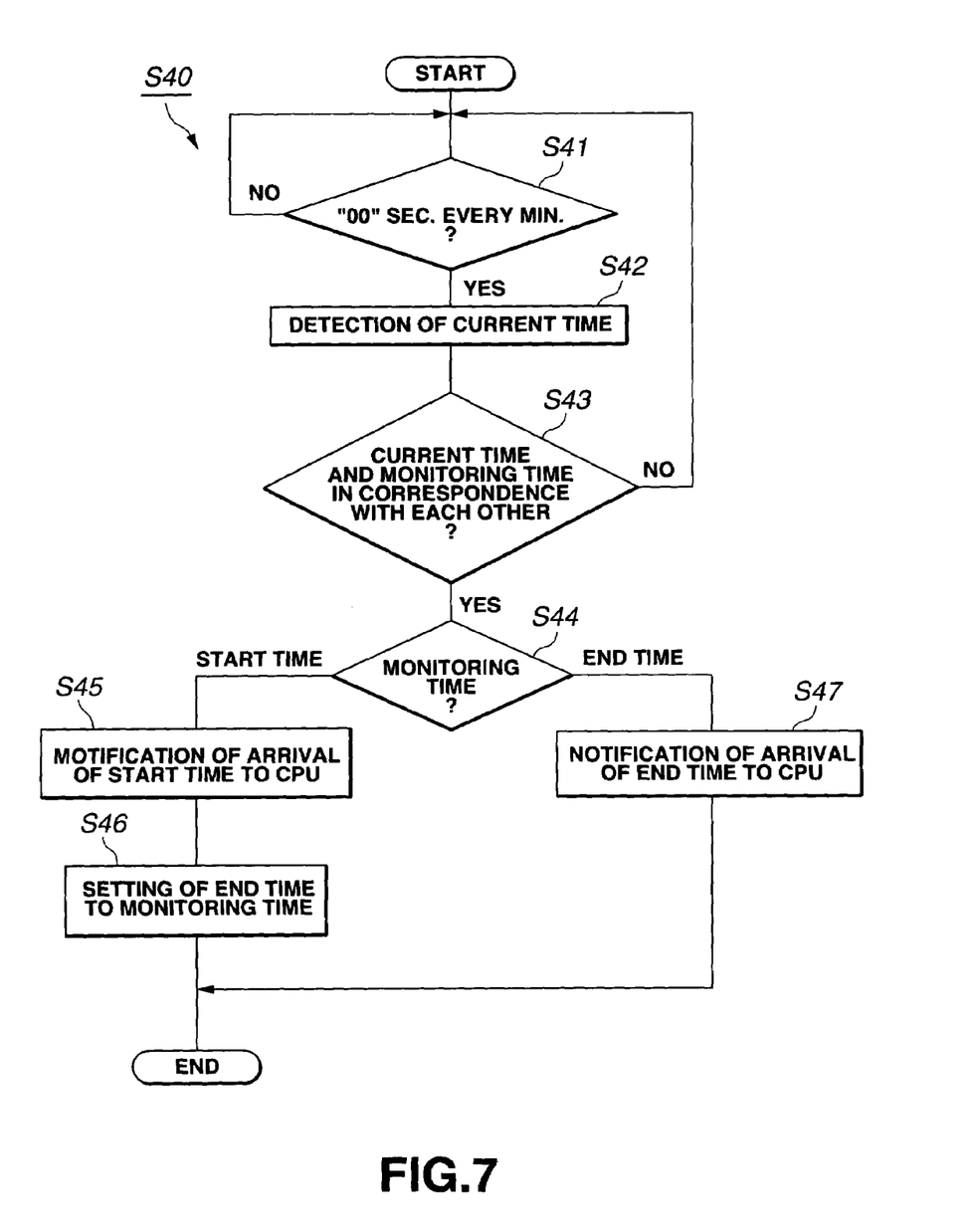
FIG. 7 is a flowchart for explaining more practical operation of timer in interruption processing.

Namely, at times subsequent to the timer reserved processing (S3) shown in FIG. 5, as shown in FIG. 7, monitoring of time is carried out, e.g., every one minute until start time is reached. For example, at the time point when, e.g., start time is reached, start time notification is carried out with respect to the CPU 11.

Returning to FIG. 5, the operation of the CPU 11 after start time notification is received will be described.

When the CPU 11 detects start time notification from the timer 45 (S4), it starts display control with respect to the display section 24 (S5) to carry out processing to allow the display section 24 to display required operation state and active mark 48 (S6). Further, the CPU 11 carries out a control to start designation operation set by the timer reservation setting processing (S7). Thus, the processing shifts to timer operation mode (S8). This timer operation mode is operation mode for carrying out a required operation at timer designation time monitored by the timer 45, e.g., for a time period between start time and end time.

When the operation mode shifts to the timer operation mode, the CPU 11 carries out judgment as to whether or not operation of user is carried out with respect to active mark 48 displayed on the display section 24 (S9). At times subsequent thereto, at the CPU 11, until input of active mark 48 or end time notification by notification interruption processing S40 of the timer 45 is received (accepted), the timer operation mode is continued.

When operation of the active mark 48 is detected at step S9, the CPU 11 carries out designation to inhibit interruption processing with respect to the timer 45 (S10) to clear monitoring information stored in the RAM 13 (S11).

In this example, detection of operation of the active mark 48 at the step S9 is carried out by detecting, at an input detecting section 42, coordinate values when the active mark 48 is pressed by input pen 93, etc. at the display section 24. The input detecting section 42 retrieves as to whether or not detected coordinate values correspond to object indicated at a predetermined position on the display section 24, whereby when they are coordinate values corresponding to the active mark 48, the input detecting section 42 notifies to the CPU, 11 that operation with respect to the active mark 48 is detected.

Further, the CPU 11 erases the active mark 48 at the display section 24 (S12) to cancel timer reservation information set at the step S1, i.e., to clear reservation information at the RAM 13 (S13). By this operation, the operation mode shifts to ordinary operation mode to carry out required operation irrespective of timer reservation information and/or monitoring time (S14). Namely, the recording/reproducing unit 10 is caused to be of structure in which when user operates the active mark 48 in the case where designation operation is executed by timer reservation, the reservation content can be canceled, and the recording/reproducing unit 10 is controlled so that reproduction operation can be carried out subsequently to the end time that user sets at the time of reservation. The display form of the display section 24 in this case corresponds to the state shown in FIG. 4A.

On the other hand, when operation of the active mark 48 is not detected (S9), the CPU 11 carries out judgment as to whether or not end time notification is received by notification interruption processing S40 from the timer 45 (S16). In this case, for a time period during which end time notification is not detected, the CPU 11 carries out judgment as to whether or not operation of the active mark 48 has been carried out.

Further, when the CPU 11 receives end time notification in the state where operation of the active mark 48 by user is not detected, it carries out designation to inhibit interruption processing with respect to the timer 45 (S17) to clear monitoring information stored in the RAM 13 (S18). Further, the CPU 11 erases the active mark 48 at the display section 24 (S19) to cancel the reservation content set at the step S1, i.e., to clear timer reservation information at the RAM 13.

Further, the CPU 11 carries out end processing to complete designation operation followed by end (completion) of timer reservation (S21). It is to be noted that such a control may be carried out to, e.g., allow power supply of the recording/reproducing unit 10 to be turned OFF, etc.

Namely, at the recording/reproducing unit 10, as indicated by the step S16 to the step S21, in the case where the active mark 48 is not operated, designation operation can be completed at the end time set at the timer reservation setting processing (S1). In addition, in the case where the recording/reproducing unit 10 carries out designation operation in the state where timer reservation is not set, active mark 48 is not displayed. Accordingly, this does not give troublesomeness from a visual point of view at the display section 24 with respect to user, and can prevent that erroneous operation is caused to take place.

It is to be noted that while, in the processing indicated by the flowchart of FIG. 5, there is mentioned the example where the reservation content, e.g., start time or end time is cleared by operation of the active mark 48, there are conceivable such cases where there are repeatedly carried out reservation contents, e.g., time every day, time every week, times from Monday to Friday, times from Monday to Saturday, etc. In such a case, there may be conducted a control to stop only the operation of the timer 45 to sfift to ordinary operation state to hold or preserve reservation content and monitoring information at the RAM 13 without clearing them.

Figure 8:
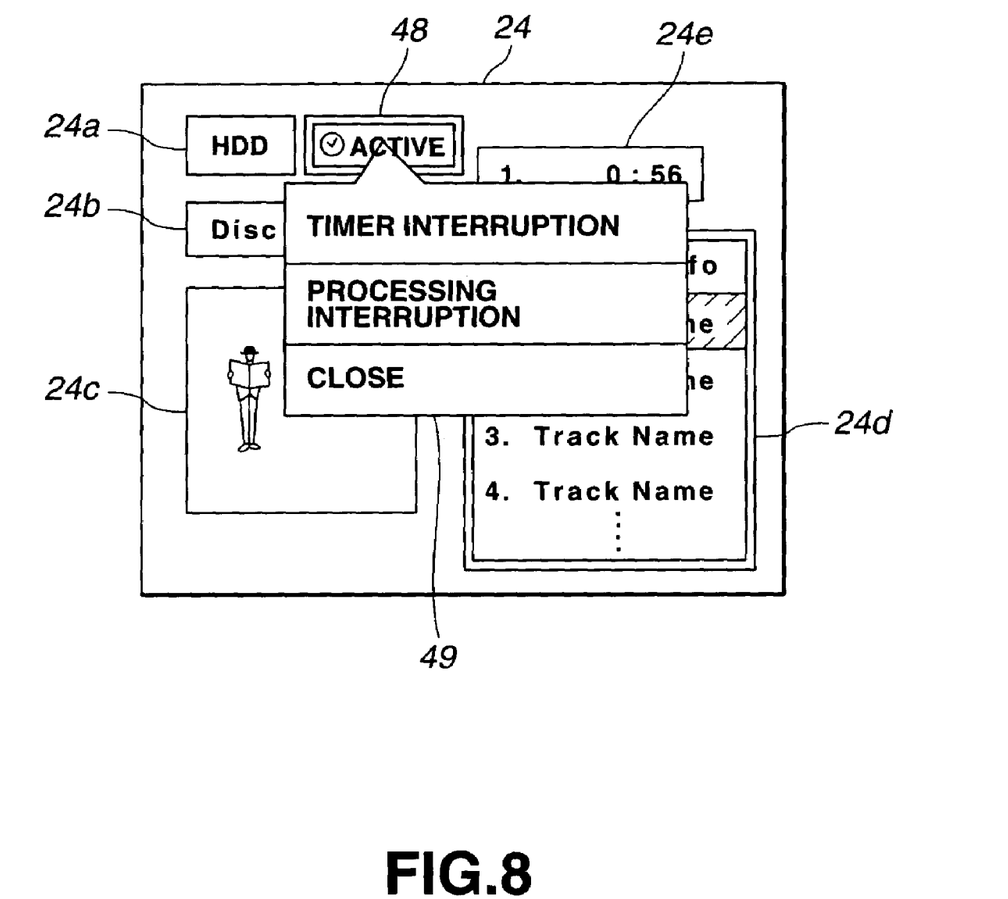
FIG. 8 is a view showing another more practical display example in display section of the recording/reproducing unit.

Moreover, while the example where operation of the timer 45 is stopped by the active mark 48 has been described in the above-described more practical example, there may be employed a configuration such that when operation of the active mark 48 is carried out, user can select processing thereafter. In this case, when user carries out input operation of the active mark 48 in the state where display as shown in FIG. 4B is being carried out at the display section 24, e.g., display as shown in FIG. 8 is carried out. Namely, such an approach is employed to carry out such a control to display menu picture 49 of the window form on the basis of input operation of the active mark 48 to carry out selection of processing item by this menu picture 49. In the example shown in FIG. 8, there are indicated, e.g., three operation items of "timer interruption" to stop only operation of the timer 45 to continuously carry out designation operation being carried out, "operation interruption" to stop processing of the timer 45 and to also stop designation operation being carried out, and "close" to erase this menu picture 49 without carrying out selection of the processing item.

As the operation procedure, e.g., input operation is carried out with respect to the active mark 48 by input pen 93, etc. to thereby display menu picture 49, and input operation is carried out with respect to item that user desires of operation items displayed on this menu picture 49 by input pen 93. Thus, processing corresponding to the above-mentioned item is executed. Namely, user selects "timer interruption" in the case where he desires to stop only the operation of the timer 45, and selects "operation interruption" in the case where he desires to also stop designation operation being carried out. In addition, while user displays the menu picture 49, in the case where he desires to continue designation operation on the basis of the operation of the timer 45 as it is, he selects "close". Thus, processing operation can shift to the state shown in FIG. 4B.

It is to be noted that operation items displayed on the menu picture 49 are an example, and there may be thus displayed item by which operation required for user can be realized in addition to the example shown in FIG. 8.

Moreover, while explanation has been given by taking the example of the recording/reproducing unit 10 in which CD-ROM drive 17, MD drive 18 and tuner 46, etc. are integrally constituted, this invention can be applied also to the case where respective components are separately constituted.

Further, this invention can be applied not only to, e.g., audio equipment for carrying out recording/reproduction of music, etc. as in the recording/reproducing unit 10, etc., but also to various electronic equipments for carrying out operation control, e.g., operation start and operation end by the timer reservation, e.g., as in the air-conditioner.

Further, while, in the above-described more practical example, there has been described the example where operation control relating to recording/reproduction of the recording/reproducing unit 10 is carried out on the basis of timer setting by user, operation control as described below may be employed.

For example, such operation control may be transfer operation of data from HDD 15 of the recording/reproducing unit 10 to memory means that the portable unit 50 has, or transfer operation of data from memory means that the portable unit 50 has to HDD 15 of the recording/reproducing unit 10.

In addition, there may be employed a configuration in which, e.g., operation such that file, that user desires, set on the basis of request signal by user is down-loaded with respect to HDD 15 of the recording/reproducing unit 10 through communication line 3 from information center 1, etc. is caused to undergo operation control on the basis of timer setting by user of the embodiment of this invention.

In the case of down-load operation of data from the information center 1 to the recording/reproducing unit 10, for a time period during which down-load operation of timer-reserved predetermined data is being executed within a predetermined time, e.g., 2:00 to 6:00 of midnight, active mark is displayed on the display section 24. When active mark 48 is designated for a down-load operation of predetermined data by user, down-load operation of predetermined data is continued even if current time is passed over 6:00 set as down-load end time, and is executed until down-load of predetermined data is completed. Thus, also in the case where down-load operation is not completed at set end time, user can easily releases setting of end time. Accordingly, such an inconvenience that data to be down-loaded is broken or cut in the middle dose not take place.

INDUSTRIAL APPLICABILITY

As apparent from the above-mentioned explanation, in this invention, such an approach is employed to set time designated by user to control the operation of electronic equipment in accordance with the set time. When the electronic equipment is operative, display section is controlled so that specific display is carried out. Designation of user with respect to the specific display is detected, whereby when designation of user is detected, a control is conducted such that set time is neglected and the operation of the electronic equipment when the designation of user is detected is continued. In the case where there is necessity to carry out designation operation subsequently also to end time by the timer reservation by controlling the electronic equipment in this way, designation operation can be continued without necessity of complicated operation.

What is claimed is:

1. An electronic equipment permitted to undergo an operation control based on a timer reservation by a user of the equipment, the electronic equipment comprising:

setting means for setting a time designated by the user;

operation control means for controlling an operation of the electronic equipment in accordance with the time set by the setting means;

display means for displaying operation means for use in operating the electronic equipment;

display control means for controlling the display means so that when the electronic equipment is operative in accordance with the operation control means, a predetermined display is carried out on the display means; and designation detecting means for detecting designation of the user with respect to the predetermined display, wherein when designation of the user is detected by the designation detecting means, the operation control means conducts a control whereby the time set by the setting means is neglected and operation of the electronic equipment is continued.

2. The electronic equipment as set forth in claim 1, wherein when designation of user is detected by the designation detecting means, the display control means completes the predetermined display.

3. The electronic equipment as set forth in claim 1, wherein the setting means sets at least an end time of a predetermined operation of the electronic equipment.

4. The electronic equipment as set forth in claim 3, wherein the operation control means is operative so that when designation of user is detected by the designation detecting means, a control is carried out such that even when a current time passes over the end time set by the setting means, the operation of the electronic equipment when is continued.

5. The electronic equipment as set forth in claim 3, wherein the setting means sets a plurality of operations of the electronic equipment and respective start times and end times thereof.

6. The electronic equipment as set forth in claim 5, further comprising:
memory means for storing data;
reproducing means for reproducing at least data stored in the memory means; and
recording means for recording data in the memory means, wherein the setting means can select, as an operation of the electronic equipment, either reproduction operation by the reproducing means or recording operation by the recording means.

7. The electronic equipment as set forth in claim 5, further comprising receiving means whereby desired data can be down-loaded from an external source, wherein the setting means can select a down-load operation for down-loading data from the external source by the receiving means as the operation of the electronic equipment.

8. The electronic equipment as set forth in claim 1, wherein when designation of the user is detected by the designation detecting means, the operation control means selectively conducts a control to neglect the time set by the setting means and to continue operation of the electronic equipment or to cancel the time set by the setting means and to stop operation of the electronic equipment.

9. An operation control method for an electronic equipment that is permitted to undergo operation control based on a timer reservation by a user of the equipment,
the method comprising:
a setting step of setting a time designated by the user;
an operation control step of controlling an operation of the electronic equipment in accordance with the set time;
a display control step of controlling display means so that when the electronic equipment is operative a predetermined display is carried out;
a designation detection step of detecting a designation of the user with respect to the predetermined display; and
a step of conducting a control such that when the designation of the user is detected at the designation detection step, the set time is neglected and operation of the electronic equipment is continued.

* * * * *